United States Patent [19]
Natori

[11] Patent Number: 4,738,382
[45] Date of Patent: Apr. 19, 1988

[54] CLAMPING APPARATUS FOR SPARE TIRE

[75] Inventor: Sadaaki Natori, Toyota, Japan

[73] Assignee: Toyota Jidosha Kabushiki Kaisha, Aichi, Japan

[21] Appl. No.: 17,039

[22] Filed: Feb. 18, 1987

Related U.S. Application Data

[63] Continuation of Ser. No. 875,255, Jun. 17, 1986, abandoned, which is a continuation of Ser. No. 710,097, Mar. 11, 1985, abandoned.

[30] Foreign Application Priority Data

Mar. 21, 1984 [JP] Japan ................... 59-40304

[51] Int. Cl.$^4$ ............................................. B62D 43/00
[52] U.S. Cl. ................... 224/42.24; 224/42.12
[58] Field of Search .......... 224/42.24, 42.12, 42.45 R, 224/273; 411/277, 278, 279, 301, 302, 304; 211/23, 24; 157/14, 20; 248/222.3

[56] References Cited

U.S. PATENT DOCUMENTS

| 298,843 | 5/1884 | Gissinger | 411/304 |
| 1,677,212 | 7/1928 | Rouanet | 224/42.24 |
| 2,255,384 | 9/1941 | Hood | 411/277 |
| 3,498,352 | 3/1970 | Duffy | 411/302 |

FOREIGN PATENT DOCUMENTS 2068862A 8/1981 United Kingdom .

Primary Examiner—Henry J. Recla
Assistant Examiner—David Voorhees
Attorney, Agent, or Firm—Parkhurst & Oliff

[57] ABSTRACT

The invention relates to a clamping apparatus for installing a spare tire on a vehicle body. The clamping apparatus includes a bracket provided on the body; a retainer for pressing the spare tire in the direction of the body; a bolt having on its distal end side a first screwing portion for engaging with the bracket and on its proximal side a second screwing portion for engaging with the pressing member; and a stopper provided on the proximal end side of the first screwing portion. The frictional resistance of the first screwing portion is formed such as to be smaller than that of the second screwing portion.

10 Claims, 3 Drawing Sheets

CLAMPING APPARATUS FOR SPARE TIRE

This is a continuation of application Ser. No. 875,255 filed June 17, 1986 which in turn is a continuation of application Ser. No. 710,097 filed Mar. 11, 1985 now abandoned.

BACKGROUND OF THE INVENTION

1. Field of the Invention

The present invention relates to a clamping apparatus for a spare tire comprising a bracket provided on a vehicle body, a pressing member for pressing the spare tire in the direction of the body, a bolt whose distal end is formed as a screwing portion for engaging with the bracket and whose proximal end is formed as a screwing portion for engaging with the pressing member.

2. Description of the Related Art

A conventional example will be described with reference to FIG. 1. In the figure is shown a clamping apparatus 3 for securing a spare tire 1 onto a vehicle body 2. The clamping apparatus 3 comprises a bracket 4 provided on the vehicle body 2, a retainer 5 for pressing the spare tire 1 in the direction of the body 2 by coming into contact with the wheel 6 of the spare tire 1, and a bolt 3A. The distal end of the bolt 3A is engaged with the bracket 4, which causes the retainer provided on the proximal end side of the bolt 3A to come into contact with the wheel 6 of the spare tire 1, thereby pressing the spare tire 1 in the direction of the body 2. The overall length of the bolt 3A is set to be in correspondence with the interval between the bracket 4 and the wheel 6, i.e., the width of the tire, so as to prevent any decline in the installation efficiency attributable to the bolt 3A being too long with respect to the tire width. In other words, several clamping apparatus 3 of varying lengths are provided in correspondence with various tire widths, and a suitable one is used in each case. Reference numeral 7 in Figure denotes a handle.

However, when each of the several types of clamping apparatus 3 is used in correspondence with the tire width, there has been a drawback in that mistakes are liable to occur whereby it is not properly used and that those of the clamping apparatus which ar not in use are liable to become lost. In addition, from the viewpoint of conservation of resources and energy, tempered tires of narrower width have frequently come to be used, while on the other hand there are also wide tires such as those for aluminum wheels. Therefore, it has been keenly desired to provide a clamping apparatus which is capable of easily clamping tire regardless of these varying dimensions in width.

SUMMARY OF THE INVENTION

The present invention was made in the light of the aforementioned situation, and an object of the present invention is to provide a clamping apparatus for a spare tire which is capable of coping with tires of different widths using a single type of clamping apparatus and which makes it possible to effect the clamping work easily.

To attain the above-mentioned object, the present invention is characterized by the following: The distal end side of a bolt is formed as a screwing portion for engaging with a bracket secured to a body, while the proximal end side is formed as a screwing portion for engaging with a pressing member for pressing a spare tire in the direction of the body. A stopper is provided on the proximal end side of the screwing portion for engaging with the bracket, and, at the same time, is formed such that the frictional resistance of said screwing portion is smaller than that of the screwing portion for engaging with the pressing member. Because of such an arrangement, the bolt is first rotated integrally with the pressing member, and the screwing portion at its distal end is engaged with the bracket. After the screwing-in motion is stopped by the stopper, the pressing member is rotated about the screwing portion of the bolt so as to move its position.

Since the present invention is arranged such that, by varying the frictional resistance, the bolt is first rotated integrally with the pressing member, and after the screwing portion at the distal end is engaged with and stopped by the bracket, the pressing member is then rotated about the screwing portion to move its position, it is possible to clamp several types of tires with varying widths by setting in advance the overall length of the bolt such as to make it capable of coping with the widest of tires. Accordingly, the present invention eliminates any possibility of losing clamping apparatus not in use, as has been encountered with a conventional type. In addition, clamping work can be effected easily since it involves only the rotation of the pressing member. Furthermore, since a stopper is provided on the proximal end side of the screwing portion located on the distal end side of the bolt, the integral rotation of the bolt and the pressing member can be positively released, and it becomes possible to avoid the need for space to be used wastefully on the rear side of the bracket.

DETAILED DESCRIPTION OF THE INVENTION

Figure 1:
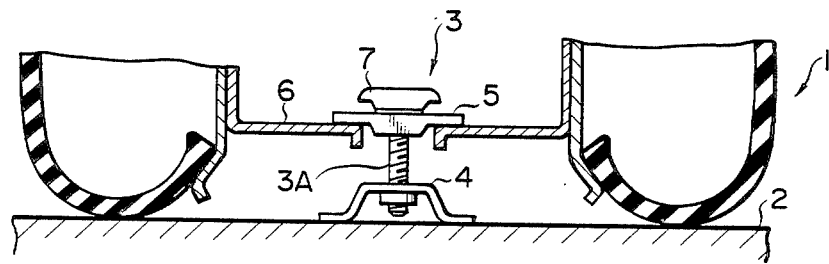
FIG. 1 is a side elevational view partly in section of a conventional clamp bolt illustrating the condition of its use.
Figure 2:
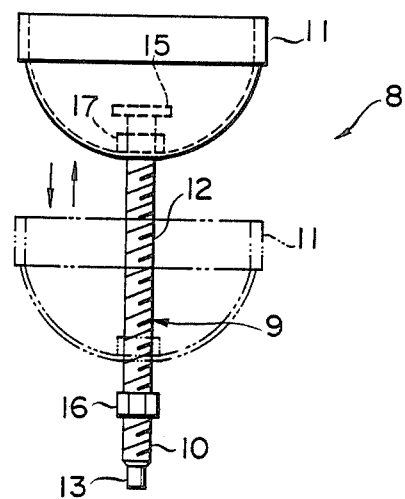
FIG. 2 is a side elevational view illustrating an embodiment of a clamping apparatus relating to the present invention.
Figure 3:
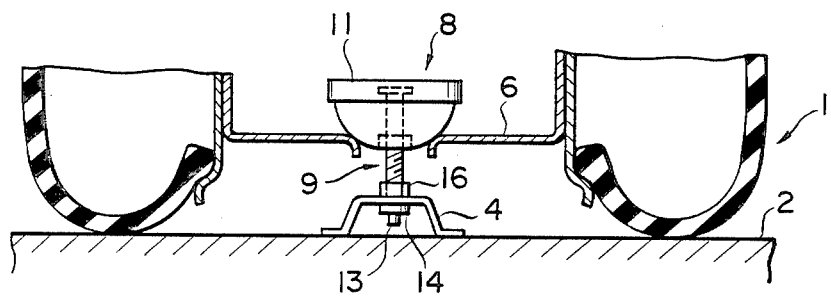
FIG. 3 is a side elevational view partly in section of said clamping apparatus illustrating the condition of its use.

Detailed description of the present invention will be made hereafter on the basis of its embodiments shown in the drawings. FIG. 2 is a side elevational view illustrating an embodiment of a clamping apparatus relating to the present invention, and FIG. 3 is a side elevational view partly in section of said clamping apparatus illustrating the condition of its use.

A clamping apparatus 8 relating to the present invention comprises a bracket 4 secured to a vehicle body 2, a retainer 11 for pressing a spare tire 1 onto the body 2, and a bolt 9 for clamping the spare tire 1. To simplify the drawing, the bracket is omitted from FIG. 2. The retainer 11 has a semispherical shape and is adapted to securely come into contact with the wheel 6 of the spare tire 1. As for the bolt 9, its distal end is formed as a screwing portion 10 for engaging with the bracket 4 secured to the body 2, while its proximal end is formed as a screwing portion 12 for engaging with the retainer 11 for pressing the spar tire 1 in the direction of the body 2. A guide 13 whose diameter is smaller than that of the bolt 9 is provided at the distal end of the bolt 9 in such a manner as to project therefrom and thus facilitate insertion of the bolt 9 into a nut 14 integrally secured to the bracket 4. At the same time, a stopper 15 is detachably fitted to the proximal end of the bolt 9 to ensure that the retainer 11 will not undesirably drop off. Additionally, the overall length of the bolt 9 is made long enough to cope with the widest of tires.

A stopper 16 is provided on the proximal end side of the screwing portion 10 of the bolt 9 for engaging with the bracket 4 and is formed to forcefully stop the engagement of the screwing portion 10 with the bracket 4. The screwing portion 10 is formed to be short enough that it will not undesirably come off the bracket 4 and is arranged such that there will be no wasteful need for space on the rear side of the bracket 4. The stopper 16 is formed with a hexagonal cross section and is arranged such that, at the time of engaging th retainer 11 with the screwing portion 12 of the bolt 9, the retainer 11 can be rotated with the stopper 16 secured with a wrench (not shown).

Figure 4:
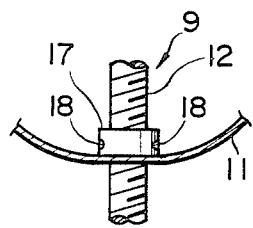
FIGS. 4 to 7 are enlarged side elevational views partly in section of essential part of other embodiments arranged such as to increase the frictional resistance of screwing portions, respectively.

The frictional resistance of the screwing portion 10 of the bolt 9 for engaging with the bracket 4 is formed to be smaller than that of the screwing portion 12 for engaging with the retainer 11. In other words, the arrangement is such that the torque for screwing the retainer 11 about the screwing portion 12 on the proximal end side of the bolt 9 is formed to be larger than the torque for screwing the screwing portion 10 at the distal end of the bolt 9 into the nut 14 of the bracket 4. FIG. 4 shows an embodiment of an arrangement for increasing the frictional resistance of the screwing portion 12, wherein a nut 17 is welded to the retainer 11 and caulked portions 18, 18 . . . are provided on the nut 17 so that the frictional resistance between the nut 17 and the scrwing portion 12 is increased.

Figure 5:
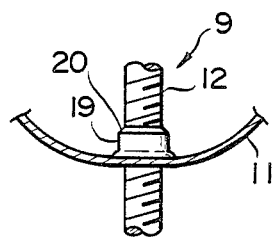
Figure 6:
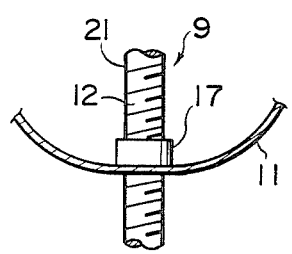
Figure 7:
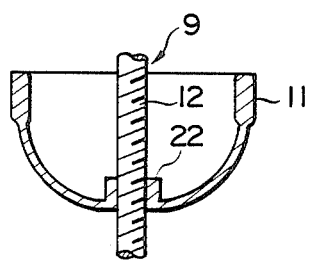

FIGS. 5 to 7 show other embodiments arranged such as to increase the frictional resistance of the screwing portion 12. FIG. 5 shows an arrangement in which a nut 19 is welded to the retainer 11 and a tapered portion 20, which is provided on the edge of the nut 19 opposite to the retainer 11, has been pressed in the direction of the bolt. FIG. 6 shows an arrangement in which the surface of the screwing portion is coated with a resin 21. FIG. 7 shows an arrangement in which the retainer 11 and a nut 22 are integrally formed of a resin, and the inside diameter of the bolt-penetrating hole of the nut 22 is formed such as to be slightly smaller than the diameter of the screwing portion 12. Incidentally, in the case of the embodiment shown in FIG. 6, a similar effect can be obtained even if the resin coating is provided on the engaging surface of the nut 17.

Next, description of the operation of the clamping apparatus according to the present invention will be made with reference to FIG. 3. After the guide 13 at the distal end of the bolt 9 is inserted into the nut 14 of the bracket 4, the retainer 11 is rotated in the screwing-in direction. Then, due to the difference in frictional resistance, the bolt 9 rotates integrally with the retainer 11, and the screwing portion 10 at its distal end is engaged with the nut 14 of the bracket 4 and is screwed in until the stopper 16 comes into contact with the bracket 4. When the screwing-in motion of the screwing portion 10 is consequently stopped, the retainer 11 is screwed in while rotating about the screwing portion 12 of the bolt 9. Thus, the retainer 11 clamps the spare tire 1 as the retainer 11 moves its position and comes into contact with the wheel 6 of the spare tire 1. Even if the tire width is different, it becomes possible to cope with such tire width simply by changing the amount by which the retainer 11 is screwed in about the screwing portion 12. To release the clamp, first, if the retainer 11 is rotated in the direction opposite to the screwing-in direction, the retainer 11 rotates about the screwing portion 12 and is separated from the wheel 6, then the retainer 11 and the bolt 9 rotate integrally, and the screwing portion 10 at the distal end is removed from the bracket.

Figure 8:
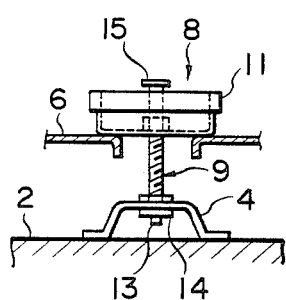
FIGS. 8 and 9 are side elevational views partly in section of still other embodiments of the present invention, respectively.
Figure 9:
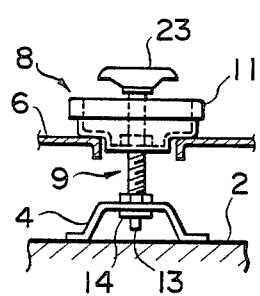

FIGS. 8 and 9 show still other embodiments of the present invention, in which the shape of the retainer 11 is made different from the semispherical shape shown in the aforementioned embodiment. In the case of the retainer 11 shown in FIG. 8, its portion of contact with the wheel 6 is flat, while, in the case of the retainer 11 shown in FIG. 9, its contacting portion has a stepped structure. Any of these embodiments exhibit the same effect of operation as that of the aforementioned embodiment. Incidentally, if a handle 23 is provided as shown in FIG. 8, the handle 23 can be conveniently used at the time of changing the screwing-in position of the bolt 9 with respect to the retainer 11 when not being used after being fitted to the screwing portion 12.

In the above, description of the present invention was made with reference to the embodiments illustrated in the drawings. However, such description is for illustrative purposes only, and it is apparent that many modifications and variations are possible within the scope of the invention.

What is claimed is:

1. A clamping apparatus for installing a spare tire on a vehicle body, comprising:
    a bracket adapted for mounting on a vehicle body and having a bolt-receiving passage therethrough;
    a pressing member for pressing said spare tire toward said vehicle body;
    a bolt having a distal end for engaging said bracket and a proximal end for engaging said pressing member, said bolt being threaded along its entire length from the distal end to the proximal end;
    a stopper carried by said bolt, said stopper being located between the distal end and the proximal end of said bolt such that a first screwing portion of said bolt is defined as that portion between the distal end and said stopper and a second screwing portion of said bolt is defined as that portion between the proxmial end and said stoper; and
    a nut having an edge surface and an engaging surface, said nut being secured to said pressing member and having means for increasing the frictional resistance between said pressing member and the second screwing portion of said bolt, such that the frictional resistance between said pressing member and the second screwing portion is greater than the frictional resistance between said bracket and the first screwing portion of said bolt;
    wherein, said pressing member is engaged with said bolt by engaging said nut with the second screwing portion of said bolt; and le
    wherein, said spare tire is installed on the vehic body by positioning a wheel portion of the spare tire over said bracket, inserting the distal end of said bolt through the wheel portion of said spare tire and into the bolt-receiving passage of said bracket, rotating said pressing member thereby rotating said bolt and advancing said bolt through the bolt-receiving passage until said stopper contacts said bracket, and then advancing said pressing member along the length of said bolt toward said bracket until said pressing member contacts the wheel portion of said spare tire; and wherein, the difference between the frictional resistance between said pressing member and the second screwing portion of said bolt and the frictional resistance between said bracket and the first screwing portion of said bolt permits said bolt to be rotated integrally with said pressing member until said stopper contacts said bracket, and prevents said pressing member from moving along the length of said bolt until after said stopper contacts said bracket.

2. An apparatus according to claim 1, wherein said nut comprises a plurality of caulked portions.

3. An apparatus according to claim 1, wherein the edge of said nut opposite to said pressing member is provided with a tapered portion, said tapered portion is pressed in the direction of the bolt.

4. An apparatus to claim 1, wherein a screwing surface of said second screwing portion is coated with a resin.

5. An apparatus according to claim 1, wherein said pressing member is formed of a resin integral with said nut, the inside diameter of a bolt-receiving hole of said nut is formed slightly smaller than the diameter of said second screwing portion.

6. An apparatus according to claim 1, wherein the engaging surface of said nut is coated with a resin.

7. An apparatus according to claim 1, wherein said pressing member has a semispherical shape.

8. An apparatus according to claim 1, wherein a portion of said pressing member contacting the wheel portion of said spare tire has a flat shape.

9. An apparatus according to claim 1, wherein a portion of said pressing member for contacting the wheel portion of said spare tire comprises a stepped portion.

10. An apparatus according to claim 1, wherein a handle is releasably screwed at the proximal end of said bolt.

* * * * *